United States Patent [19]
Adamson et al.

[11] Patent Number: 4,883,240
[45] Date of Patent: Nov. 28, 1989

[54] AIRCRAFT PROPELLER NOISE REDUCTION

[75] Inventors: Arthur P. Adamson; Philip R. Gliebe, both of Cincinnati, Ohio

[73] Assignee: General Electric Company, Cincinnati, Ohio

[21] Appl. No.: 930,065

[22] Filed: Nov. 12, 1986

Related U.S. Application Data

[63] Continuation of Ser. No. 764,144, Aug. 9, 1985, abandoned.

[51] Int. Cl.$^4$ ............................................. B64C 11/48
[52] U.S. Cl. ........................................ 244/69; 244/1 N; 244/55; 416/500; 416/129; 415/119
[58] Field of Search ........................ 244/69, 55, 1 N; 416/128, 129, 500; 415/119, 181

[56] References Cited

U.S. PATENT DOCUMENTS

| | | | |
|---|---|---|---|
| 537,612 | 4/1895 | Leathers | 416/129 |
| 1,804,312 | 5/1931 | Brown | |
| 1,880,997 | 10/1932 | Stout | 244/55 |
| 1,944,239 | 1/1934 | Honnef | 416/128 |
| 2,217,950 | 10/1940 | Honnef | 416/128 |
| 3,363,419 | 1/1968 | Wilde | 60/226 |
| 3,373,928 | 3/1968 | Erwin et al. | 230/116 |
| 3,747,343 | 7/1973 | Rosen | 60/225 R |
| 4,131,387 | 12/1978 | Kazin et al. | 415/119 |
| 4,486,146 | 12/1984 | Campion | 416/129 |
| 4,619,584 | 10/1988 | Brandt | 416/129 A |

FOREIGN PATENT DOCUMENTS

| | | | |
|---|---|---|---|
| 708096 | 7/1941 | Fed. Rep. of Germany | 416/128 |
| 521868 | 6/1940 | United Kingdom | 416/128 |

OTHER PUBLICATIONS

NASA Publication N84-13186—Technology and Benefits of Aircraft Counter Rotation Propellers—(NASA CR-168258)-Dec. 1982, p. 10-"Introduction—Acoustics"; p. 30—Acoustic Study Results-Near Field Noise; bottom of p. 31; p. 36—. . . Far-Field Noise; pp. 53—Unequal Blade Numbers; p. 130 (Tables 1 and 2) row—Propeller-Number of Blades; p. 133—Summary, Column Number of Blades FXR.

E. J. Richards, P. J. Mead;*Noise and Acoustics Fatigue in Aeronautics*, 1986, pp. 198, 199.

Primary Examiner—Galen L. Barefoot
Attorney, Agent, or Firm—Jerome C. Squillaro; Nathan D. Herkamp

[57] ABSTRACT

In one form of the invention, a counterrotating pair of aircraft propellers produces noise in the form of a frequency-modulated carrier wave. The frequency modulation allows a designer to manipulate the energy spectrum of the noise in order to, for example, place much of the acoustic energy into inaudible frequency ranges.

23 Claims, 8 Drawing Sheets

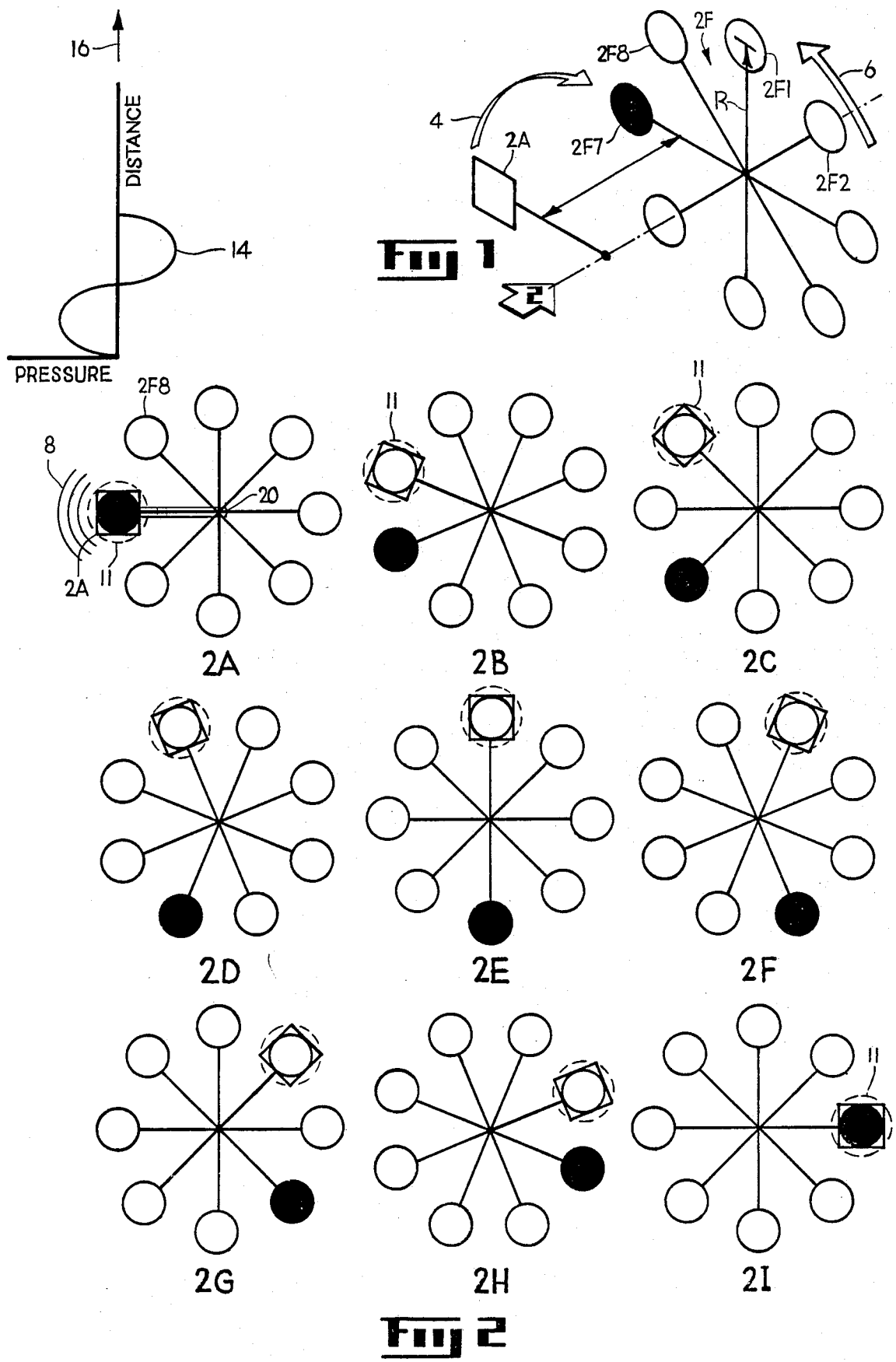

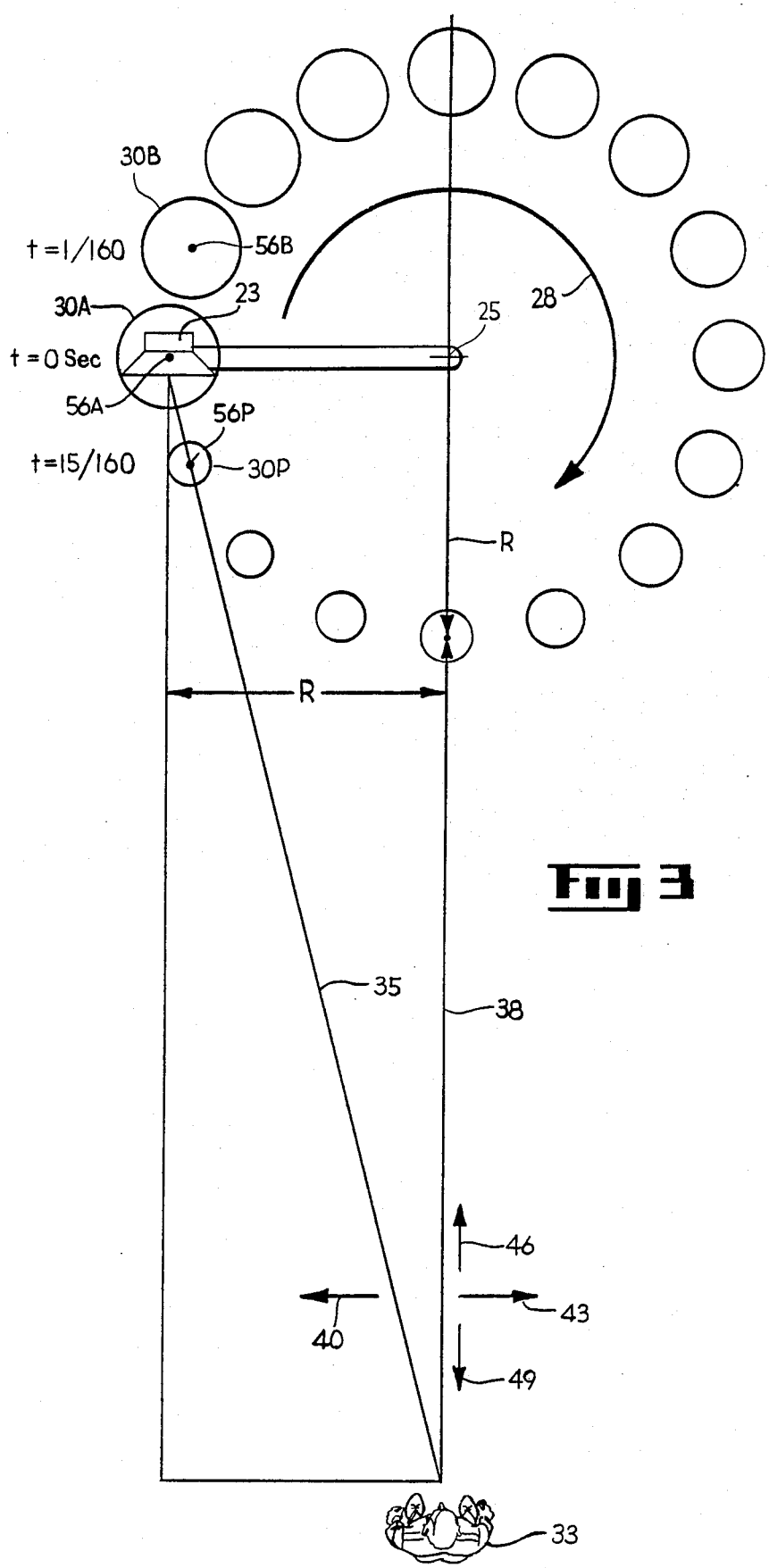

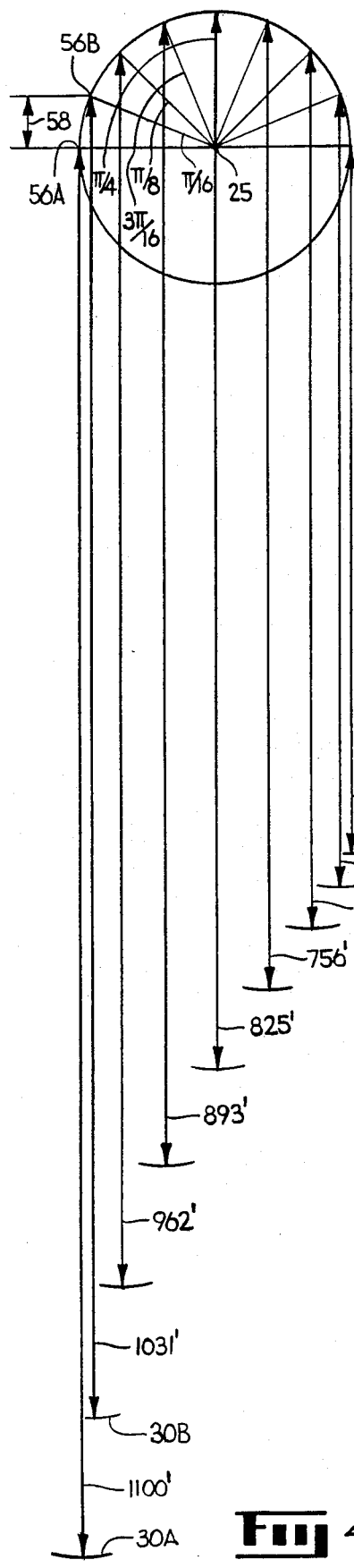
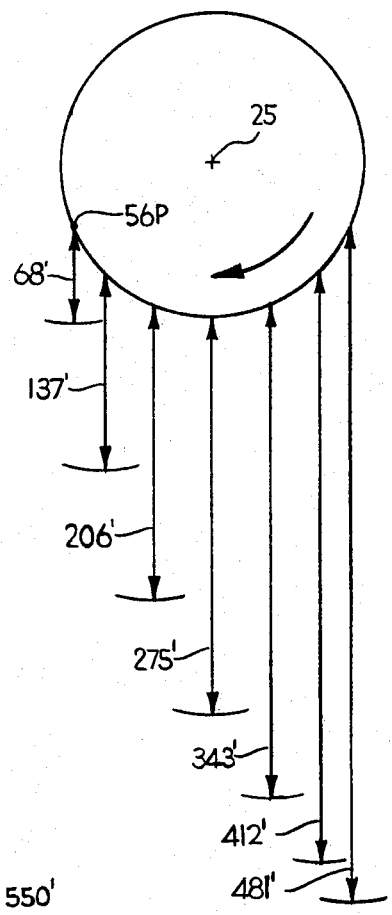
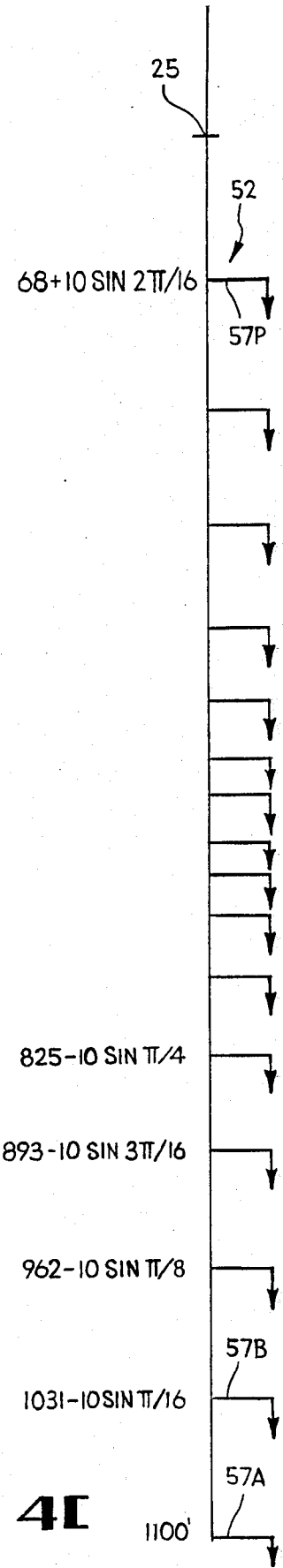
Fig 4A
Fig 4B
Fig 4C

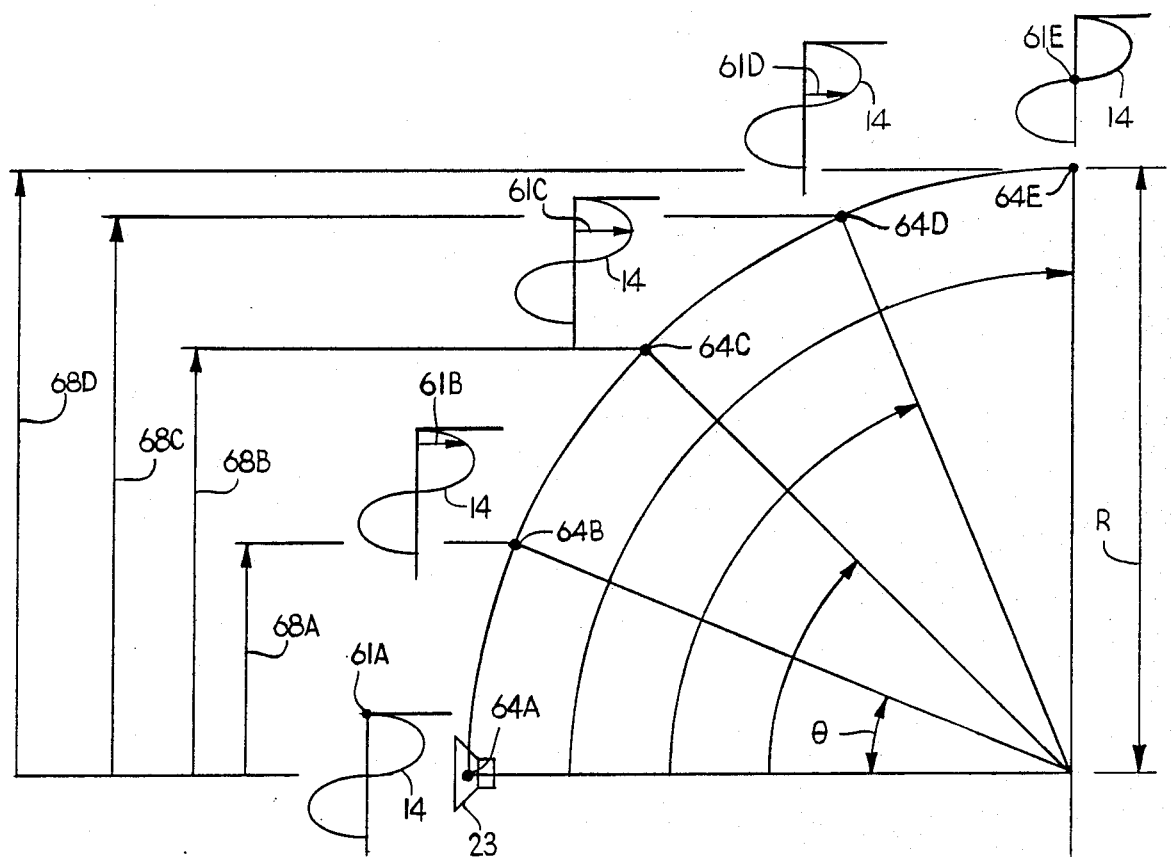
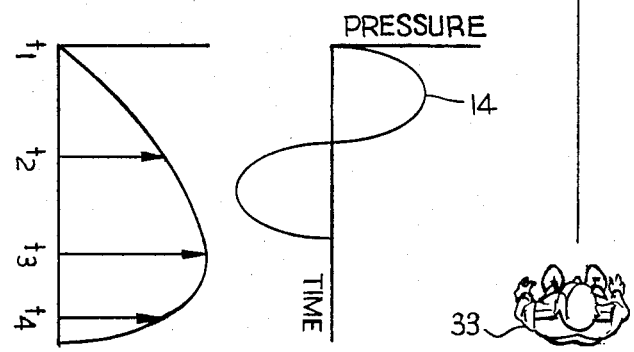
Fig 5

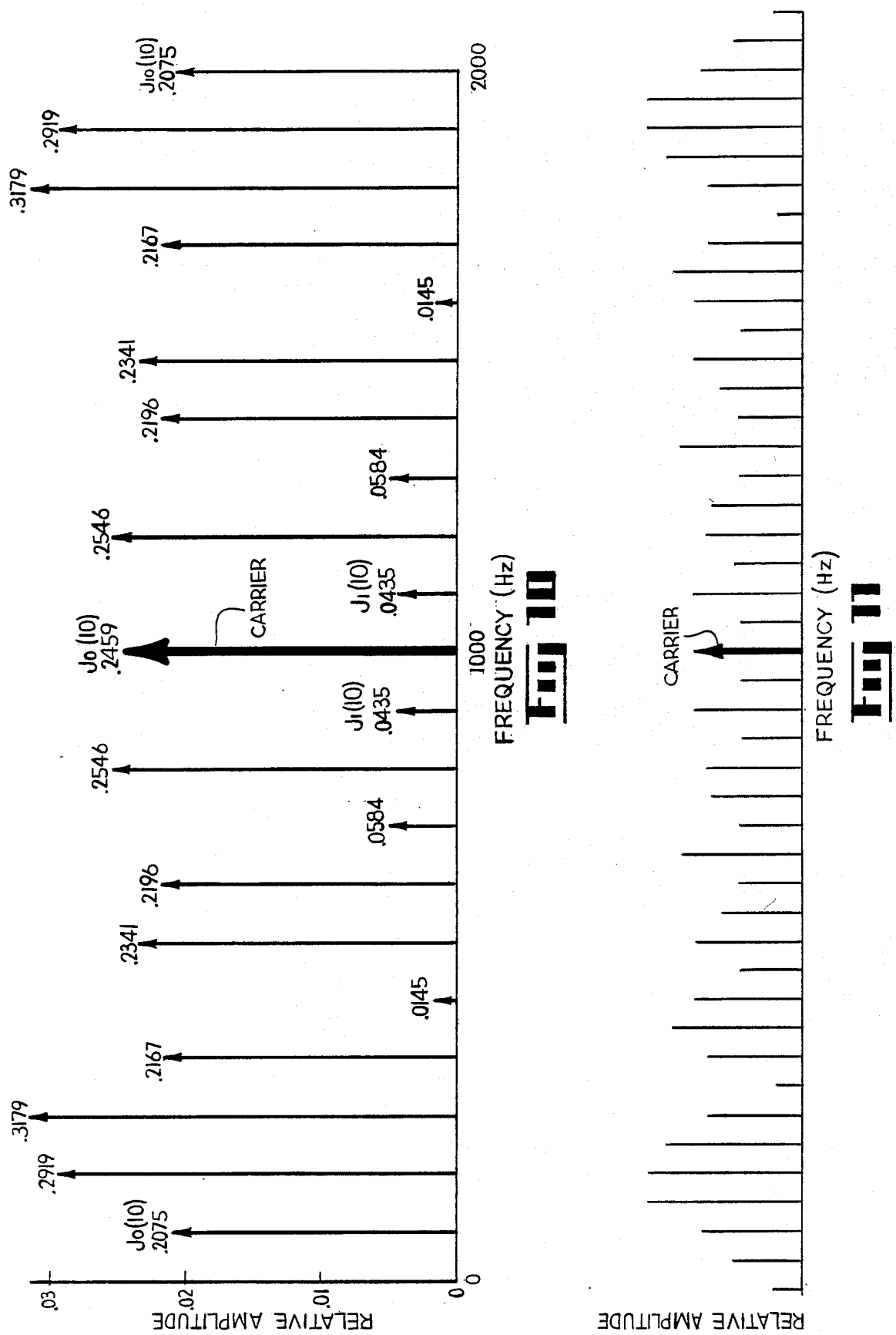

AIRCRAFT PROPELLER NOISE REDUCTION

This application is a continuation of copending Application Ser. No. 764,144 filed August 9, 1985 now abandoned.

The present invention relates to the reduction of audible noise produced by aircraft propellers.

BACKGROUND OF THE INVENTION

Each propeller blade of a rotating aircraft propeller produces a pressure wave which is perceived as sound or noise. The frequency of the noise is equal to the number of blades passing an observer every second, or N×S where N is the number of blades and S is the rotational speed.

In the case of counterrotating propellers which rotate about a common axis, such as propellers 1A and 1F in FIG. 1A, an additional source of noise exists. The additional noise is caused by blade-to-blade interactions between the fore propeller 1F and the aft propeller 1A. When an aft propeller blade passes through the wake of a fore propeller blade, a noise pulse is generated. It is desirable to reduce this additional noise.

OBJECTS OF THE INVENTION

It is an object of the present invention to provide new and improved noise reduction in counterrotating aircraft propeller sets.

SUMMARY OF THE INVENTION

In one form of the invention, a counterrotating pair of aircraft propellers produces noise in the form of a frequency-modulated carrier wave. The frequency modulation allows a designer to manipulate the energy spectrum of the noise in order to, for example, place much of the acoustic energy into inaudible frequency ranges.

BRIEF DESCRIPTION OF THE DRAWINGS

FIG. 2 illustrates the rotation of the blade crossing points when both propellers in FIG. 1 rotate.

FIG. 3 is a schematic of an observer in the plane of a rotating, pulsing noise source 23.

FIGS. 4A-C illustrate the frequency modulation introduced by the rotation of the pulsing noise 23 in FIG. 3.

FIG. 5 illustrates in detail the modification of the sinusoid 14 in FIG. 2 by the rotation of the noise source 23 in FIG. 3.

FIG. 9 illustrates a counterrotating aircraft propeller pair.

FIGS. 10 and 11 illustrate noise spectra.

DETAILED DESCRIPTION OF THE INVENTION

The inventor will describe a modeling technique which he has developed which approximates the noise produced by the wake interactions of propeller blades in a counterrotating propeller set. The technique provides a basis for propeller design.

First, a simple counterrotating model of a fore propeller having eight blades and an aft propeller having a single blade will be discussed. Next, a model in which the propellers have blade numbers differing by one (e.g., 8 and 9) will be considered. Then, the case in which the blade numbers differ by two (e.g., 9 and 11) will be analyzed, followed by a discussion of other blade numbers.

Figure 1:
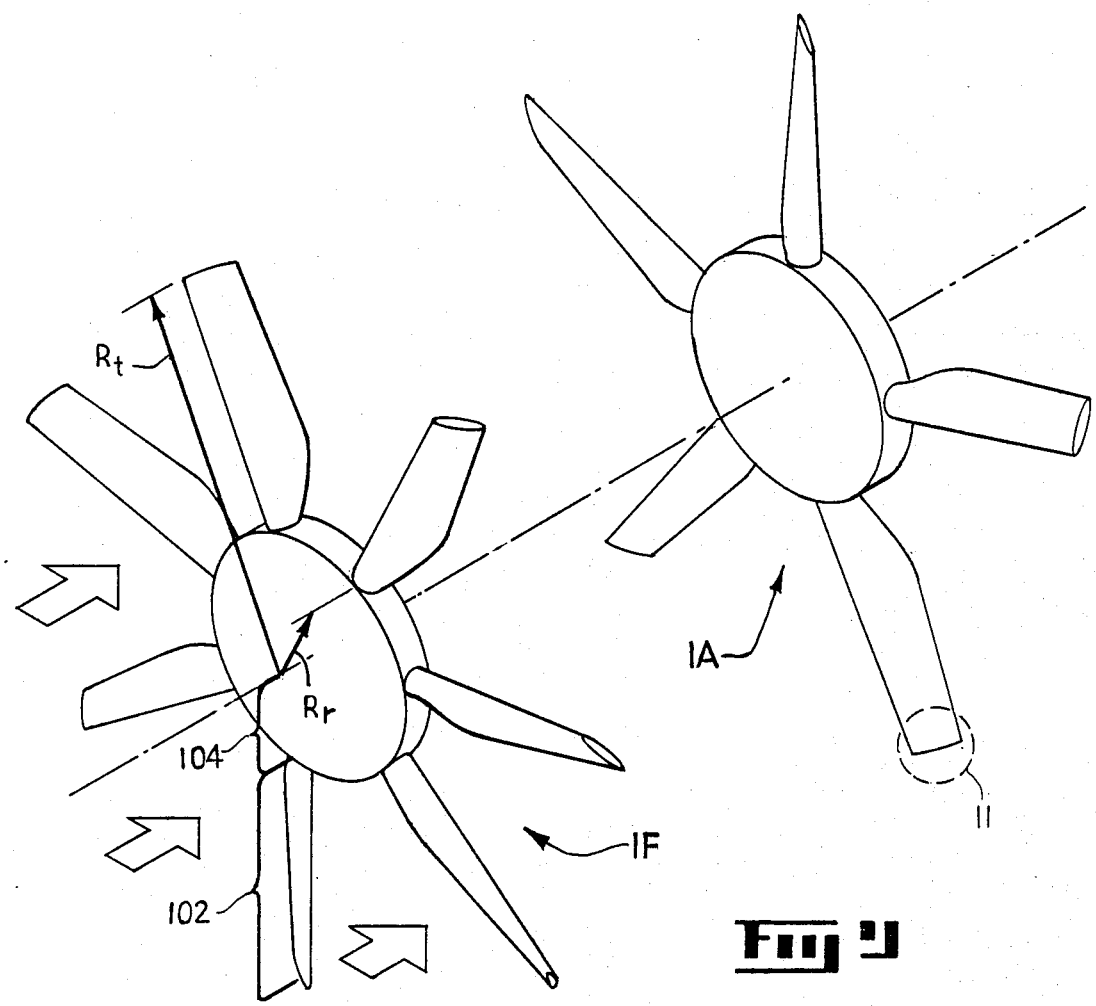
FIG. 1 is a schematic of an eight-blade/one-blade pair of propellers.
Figure 1A:
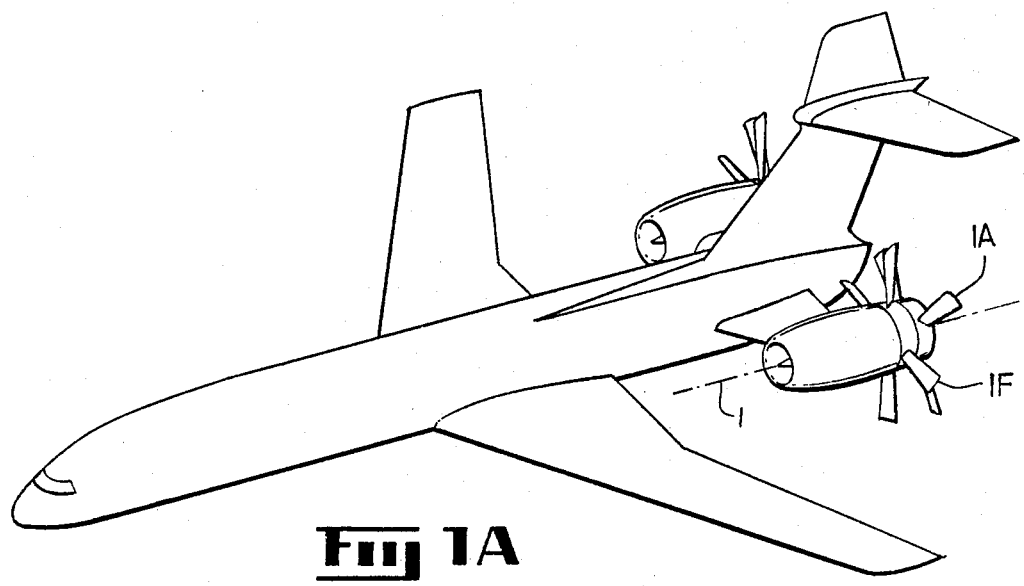
FIG. 1A illustrates a counterrotating propeller pair on an aircraft.

The term counterrotating as used herein refers to the opposite directions of rotation of two aircraft propellers sharing a common axis, such as propellers 1A and 1F on axis 1 in FIGS. 1A and 9.

For the first model, FIG. 1 illustrates schematically the two propellers. The single-bladed aft propeller is indicated by block 2A and the fore propeller is indicated by eight circles 2F1-8, representing eight blades, with circle 2F7 being indexed by shading. The propellers rotate in opposite directions as indicated by arrows 4 and 6.

As to noise, if the aft propeller 2A is stationary and only the fore blades 2F are rotating, a noise pulse (indicated by waves 8 in FIG. 2A) will be produced within dashed circle 11 every time a moving fore blade 2F passes the single stationary aft blade 2A, namely, at the rate of $N_f S_f$ times per second. $N_f$ is the number of blades on the fore propeller (eight, in this case) and $S_f$ is the rotational speed of the fore propeller in revolutions per second. In this example, with a speed of 10 revolutions per second, 80 noise pulses will be produced at dashed circle 11 every second.

The noise pulses are assumed to have a sinusoidal fundamental tone plus higher harmonics. That is, the pressure distribution as a function of distance is assumed to be a sinusoid plus higher harmonics as appropriate to the actual physical shape of the noise pulse. Sinusoidal wave behavior is assumed throughout most of this discussion, though the principles elucidated apply to the higher harmonics as well as to the fundamental (i.e., sinusoidal) tone. A sinusoid 14 is shown in the upper left part in FIG. 2. Coordinates of pressure and distance are superimposed on FIG. 2. The sinusoidal wave is traveling in the direction of arrow 16, away from dashed circle 11, at the speed of sound in the ambient medium, namely, air.

The inventor believes this assumption of a sinusoid for discussion purposes to be reasonable. However, the use of a sinusoid is for discussion purposes only and in any practical situation higher harmonics should be considered and operated on by the principles of this invention. For discussion, the single, sinusoidal tone is relevant because any arbitrary pressure distribution can be expressed as a Fourier series of sinusoids.

Having shown that the frequency is $N_f S_f$ when the fore propeller 2F alone rotates, the inventor will now discuss the frequency when both propellers rotate. FIGS. 2A through 2I view the propellers in FIG. 1 along arrow 2. These FIGS. 2A-2I illustrate a sequence of blade crossings. As before, the fore propeller speed is 10 rev/sec, and now the aft propeller's speed is assumed to be identical. Thus, the time elapsing between the situations of FIG. 2A and B is 1/160 sec, as is the time elapsing between the situations of 2B and C, and so on for all of FIG. 2. The total time elapsing between the situations of FIGS. 2A and 2I is 8/160 second.

The location of blade crossing now rotates, as shown by the movement of dashed circle 11 about center 20. The frequency of blade crossings (i.e., of noise pulses) is $$F_c = (S_f + S_a) N_f N_a \quad (1)$$

wherein $F_c$ is termed a carrier frequency (later described in more detail), $S_a$ is the speed of the aft propeller (10 rev/sec), $N_a$ is the number of blades on the aft propeller 2A (one), and the other variables are as defined above. In this example, $F_C = 160$ pulses/sec (i.e., $160 = 8 \times 1 \times [10+10]$). Restated, for every revolution of both blades, half of which is shown by the sequence of FIGS. 2A–I, there will be a total of 16 blade crossings. The sequence occurs ten times every second, producing 160 pulses per second.

The inventor points out that the situation is similar to that of FIG. 3. There, a noise source 23 (similar to dashed circle 11 in FIGS. 2A–I) rotates about a center 25 as shown by arrow 28. The noise source 23 produces a noise pulse at the frequency described above, which is, in this example, 160 pulses per second, or 16 pulses per revolution. The pulses are indicated by circles 30A–P. Circle 30A is larger than circle 30P, indicating that by the time pulse 30P is produced, pulse 30A has expanded.

An observer 33 is located within the plane of rotation. This discussion is now limited to the plane of rotation because that is where noise emission intensity is greatest, with rapid fall off of noise fore and aft of the plane of rotation. The stated principles apply to a lesser degree as the listener moves out of the plane of rotation but the need for noise reduction also decreases in such a case. In the far field, distance 35 is approximated as the sum of distances 38 and R. For example, if radius R is 6 feet and if distance 38 is 994 feet, then, by the theorum of Pythagorus, distance 35 is 1000.018 feet. The error, namely, 0.018 feet, represents a 0.0018 percent error introduced by the approximation, which is considered negligible. Thus, distance 35 is assumed to be equal to the sum of distances 38 and R.

The inventor points out that this assumption has the effect of removing the left and right motion (i.e., motion in the directions of arrows 40 and 43) of the noise source 23 as far as the observer 33 is concerned. The observer now perceives the noise source 23 as moving toward and away from himself along line 38 as shown by arrows 46 and 49 at a speed which changes sinusoidally. This motion of the noise source 23 produces a sinusoidally spaced pulse train 52 shown in FIG. 4C, as will now be explained.

Four simplifying assumptions are now made. One, the noise source 23 rotates at one rev/sec. Two, the frequency of pulsing is 16 pulses/sec. Three, the speed of sound is 1100 feet/sec. Four, the radius R is 10 feet. Under these assumptions, FIGS. 4A–B represent a snapshot of the wavefronts (i.e., circles 30A–P in FIG. 3) after one revolution, i.e., after one second.

The very first wavefront 30A (originating at point 56A in FIGS. 3 and 4A at $t = 0$ sec) traveled 1100 feet during the elapsed time of one second. The first wavefront 30A is indicated by arrow 57A in FIG. 4C. The second wavefront 30B (originating at point 56B in FIGS. 3 and 4A at time $t = 1/16$ sec) traveled 1031 feet in 15/16 second, a distance 69 feet less than the first wavefront. However, the noise source 23 had been displaced away from the observer 33 in FIG. 3 by a distance 58 equal to $10 \sin 2 \pi/16$ feet previous to pulse generation (10 is the radius, R, and $2 \pi/16$ is the angle in radians traveled by the noise source between the first and second pulses). Thus, the arrow 57B representing the second pulse in FIG. 4C is not 1031 feet from the center 25, but $(1031 - 10 \sin 2 \pi/16)$ feet.

The wavefronts 30C–30P for the rest of the pulses are computed in a similar manner, up to the 16th pulse produced at point 56P in FIGS. 3 and 4B, at $t = 1.0$ second. The arrow 57P representing this wavefront is located $68 + 10 \sin 2 \pi/16$ feet from the center 25. Thus, the rotating noise source produces the spaced pulse train 52 in FIG. 4C.

The inventor points out that such a pulse train 52 in fact is a phase or frequency modulated carrier wave. A quantitative description of this carrier wave will now be given.

First an observation is made. The speed of rotation of the pulsing noise source 23 in FIG. 3 (which is equal to the rotational speed of the dashed circle 11 in FIGS. 2A–I) is determined by, and equal to, the speed of the single aft propeller 2A in FIG. 1. One reason for this is that the presence of the single blade is a necessary condition for the occurrence of a noise pulse. This rotational speed will be referred to as a modulation frequency, $F_m$, for reasons which will become clear later. This modulation frequency is to be distinguished from the frequency of the blade crossings ($F_c$ in equation 1 above), which is a function of the blade numbers as well as of the propeller speeds.

Returning to the quantitative description, the inventor will now described in detail the modification which the sinusoid 14 in FIG. 2 undergoes as a result of rotation of the dashed circle 11. As shown in FIG. 5, the sinusoid 14 in FIG. 2 is produced piecewise as follows. Assume that part 61A in FIG. 5 of the sinusoid 14 is produced at point 64A by the noise generator 23. Part 61B is produced at point 64B, and so on up to part 61E, produced at point 64E. The length of time $t_o$ for any of the parts to traverse the radius R of the propeller is equal to $R/V_s$, where $V_s$ is the speed of sound. The successive wave parts 61A–E must travel different distances 68A–D to the observer 33, and thus the wave parts arrive at different times. Each wave part has a different time delay. These respective time delays, $t_n$, are computed from the equation $$t_n = t_o \sin \theta \quad (1A)$$

wherein the angle $\theta$ (shown in FIG. 5) equals the speed of rotation of the pulsing noise source 23 times the elapsed time, or $F_m t$, and $t_o$ is the time required for sound to traverse the radius, a time of $R/V_s$.

If there were no time delay introduced by rotation of the noise source 23 in FIG. 3, as when the single aft blade 2A were stationary as discussed above, then the sinusoids would all be produced at a single place in FIG. 5, such as point 64A. This "stationary" sinusoid can be described by the equation $$P = K \sin (2 \pi F_c t) \quad (2)$$

wherein P equals pressure (or sound intensity) and K is an arbitrary constant. Ignoring attenuation because of distance, which affects K, the observer 33 will perceive the same wave, described by the same equation, and shown as sinusoid 14.

However, when the noise source 23 rotates, a phase change is introduced as described above, and the observer now perceives a wave described by the following equation $$P = K \sin [2\pi F_c(t + t_n)] \quad (3)$$

wherein $t_n$ is the phase change and is defined above.
Restating and rearranging, $$t_n = R/V_s \sin F_m 2\pi t \quad (4)$$

$$M = 2\pi F_c R/V_s, \text{ thus} \quad (5)$$

$$P = K \sin [2\pi F_c t + M \sin F_m 2\pi t] \quad (6)$$

The inventor points out that this last equation (6) contains an angle term, $2\pi F_c t$, and a phase term, $M \times \sin F_m 2\pi t$. Further, the phase term changes as a function of time. This equation is of the form $$P = \sin(W_c t + M \sin W_M t) \quad (7)$$

wherein $W_c = 2\pi F_c$ and $W_m = 2\pi F_m$.

This equation (7) is a classical equation used in phase or frequency modulated radio work. It can be expanded into the following series:

$$\begin{aligned}P_s =\, &J_0(M) \sin W_c t + J_1(M) \sin (W_c + W_m)t - J_1(M) \sin \\&(W_c - W_m)t + J_2(M) \sin (W_c + 2W_m)t - J_2(M) \sin \\&(W_c - 2W_m)t + J_3(M) \sin (W_c + 3W_m)t - J_3(M) \sin \\&(W_c - 3W_m)t \text{ etc.}\end{aligned} \quad (8)$$

In the series, the terms $J_n(M)$ refer to Bessel factors of the first kind and nth order. Table 1, at the end of this discussion, is a compilation of some Bessel factors.

The Bessel function expansion includes a fundamental frequency, $W_c$, having an amplitude of $J_0(M)$, and a series of sidebands. The sidebands differ in frequency from the fundamental by multiples of $W_c$ and they have amplitudes of the respective terms $J_1(M)$, $J_2(M)$, etc. Equation 8 shows that the rotating, pulsating noise source 23 in FIG. 3 actually produces a noise spectrum having spectral components of $J_n(M)$.

As an example of the application of Table 1, assume a carrier frequency of 1000 Hz (i.e., $W_c = 2\pi \times 1000$), a modulation frequency of 100 Hz ($W_m = 2\pi \times 100$), and a modulation index, M, of 10. Then, from Table 1, equation 8 becomes the following.

$$\begin{aligned}P_s =\, &-0.2459 \sin W_c t + 0.0435 \sin \\&(W_c + W_m)t - 0.0435 \sin (W_c - W_m)t + 0.2546 \sin \\&(W_c + 2W_m)t - 0.2546 \sin (W_c - 2W_m)t + 0.0584 \sin \\&(W_c + 3W_m)t - 0.0584 \sin (W_c - 3W_m)t - 0.2196 \sin \\&(W_c + 4W_m)t + 0.2196 \sin (W_c - 4W_m)t - 0.2341 \sin \\&(W_c + 5W_m)t + 0.2341 \sin (W_c - 5W_m)t - 0.0145 \sin \\&(W_c + 6W_m)t + 0.0145 \sin (W_c - 6W_m)t + 0.2167 \sin \\&(W_c + 7W_m)t - 0.2167 \sin (W_c - 7W_m)t + 0.3179 \sin \\&(W_c + 8W_m)t - 0.3179 \sin (W_c - 8W_m)t + 0.2919 \sin \\&(W_c + 9W_m)t - 0.2919 \sin (W_c - 9W_m)t + 0.2075 \sin \\&(W_c + 10W_m)t - 0.2075 \sin (W_c - 10W_m)t\end{aligned} \quad (9)$$

The amplitudes [i.e., the $J_n(10)$ terms from Table 1] of the center frequency and the sidebands are depicted in FIG. 10. The reader will note how the energy spectrum becomes spread out from the carrier frequency (1000 Hz) because of frequency modulation. As M increases further, the situation of FIG. 11 is approached: many sidebands, each with very small amplitude.

The present invention can utilize the Bessel function expansion of equation 8 as follows. Given that half of the sidebands are above the carrier frequency and half are below, placing the carrier at or near the upper frequency limit of human hearing will render half of the number of sidebands inaudible. A more complex approach is to place the carrier within the audible range, but to select a large modulating frequency, $W_m$, such that the sidebands (i.e., the $J_n$ terms) are widely spaced so that those above the carrier quickly leave the audible range and those below the carrier quickly leave the audible range via the negative frequency route. Further, those which remain in the audible range should have small amplitudes, i.e., small $J_n$ terms, so that most of the energy will be associated with the many terms outside the audible range. This latter, more complex approach will probably be required when the engine is large because design constraints (e.g., propeller speed and diameter) will probably not allow $F_c$ to be near the frequency limit of human hearing.

From another viewpoint, the modulating frequency, $F_m$, controls the spacing and hence the spread of the sidebands: a large $F_m$ causes a larger span (in Hz) between neighboring sidebands and hence permits most of the energy to be moved outside the audible range (i.e., only a few, widely spaced, sideband frequencies remain in the audible range). The modulation index, M, controls the amplitude distribution of the sidebands according to Table 1, and, of course, according to more extensively computed Bessel function tables. The modulation frequency $F_m$ is the speed of rotation of the noise source 23 in FIG. 3, which is equal to the speed of rotation of the dashed circle 11 in FIG. 2 as discussed above. The modulation index M is governed by the length of time it takes sound to travel the radius of the propeller, as well as by the carrier frequency, $F_c$, as shown in equation 5.

Figure 6:
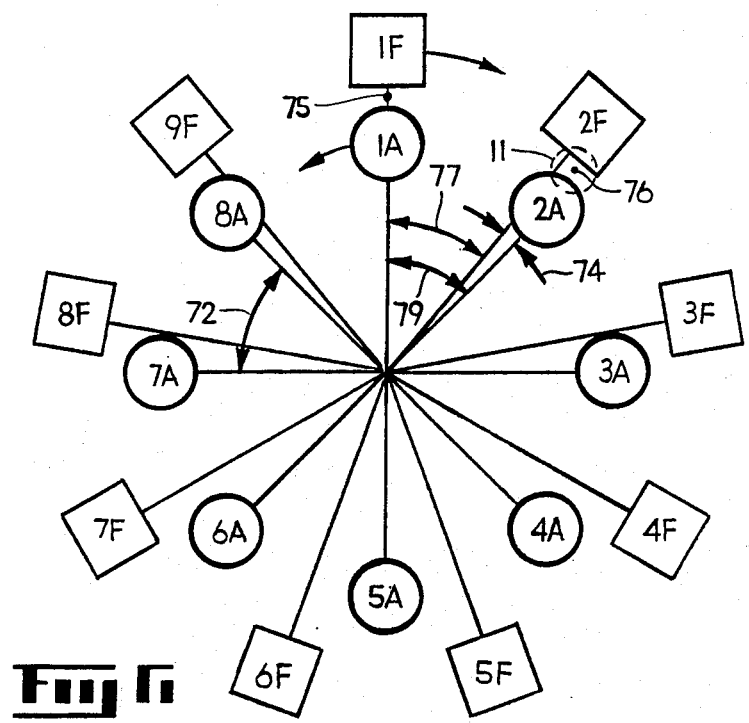
FIGS. 6 and 7 are schematic views of two counterrotating aircraft propeller pairs.

The inventor will now extend this analysis from the simplified, eight-blade/one-blade model to a model wherein the numbers of blades differ by one, such as eight and nine, shown in FIG. 6. (The diameters in FIG. 6 are different for ease of illustration.) In such a case, the blade crossings are sequential in the following sense: blade 1A crosses 1F, then 2A crosses 2F, and so on until 1A crosses 9F (not 1F). The angular distance 72 in radians between neighboring blades on a propeller is the total angle around the circumference, $2\pi$, divided by the number of blades, or $$2\pi/N \quad (10)$$

wherein N is the number of blades.

For simplicity, the term $2\pi$ in the numerator of equation (10) can be replaced by the term 1 revolution. Thus, the blade-to-blade spacing can be expressed as $$1/N \text{ revolution/blade} \quad (11)$$

As FIG. 6 shows, fore blade 1F and aft blade 1A are in the process of crossing, thereby producing a noise pulse. A subsequent pulse will be produced by a crossing of blades 2F and 2A, at about the 1:30 o'clock position shown by dashed circle 11. The speed with which the blades 2A and 2F approach each other is the sum of their individual speeds, $S_f + S_a$. The distance 74 which they must cover before crossing is the difference between their angular spacings, $1/N_a - 1/N_f$. The time T needed for the blades to cover this distance is the distance 74 divided by speed, or $$T = \frac{(1/N_a - 1/N_f) \text{ rev/blade}}{(S_f + S_a) \text{ rev/sec}} \quad (12)$$

The peculiar units of seconds/blade which result really mean seconds-per-blade-crossing. Thus, the time interval between successive crossings is T as defined in equation 12. The frequency of crossings is the reciprocal of T:

$$F_c = 1/T \tag{13}$$

This is the carrier frequency, applicable to the Bessel expansion discussed above.

The modulation frequency of the eight-blade/nine-blade propellers will now be considered. As discussed above in the eight-blade/one-blade model, $F_m$ was the rotational speed of the dashed circle 11 in FIG. 2. The present $F_m$ of the analogous dashed circle 11 in FIG. 6 is computed as follows. In the case of equal propeller speeds, the crossing point 76 will be midway between blades 2A and 2F. Thus, the distance traveled by the dashed circle 11 between crossing points 75 and 76 will be distance 79 ($=1/N_a$) plus distance 77 ($=1/N_f$) divided by 2, or $\frac{1}{2}(1/N_a + 1/N_f)$. The length of time for the dashed circle 11 to travel this distance is T seconds, as computed above in equation 12. Thus, the dashed circle (i.e., the modulating phenomenon) has a rotational speed (i.e., distance/time) of $$F_m = \frac{1/2(1/N_a + 1/N_f)}{(1/N_a - 1/N_f)/(S_f + S_a)} \tag{14}$$

Since $S_f = S_a$, and multiplying by $N_f N_a / N_f N_a$ $$F_M = S_f \frac{(N_f + N_a)}{(N_f - N_a)} \tag{15}$$

The fact that the denominator in equation (15) can be negative if $N_f$ is less than $N_a$ is insignificant because the negativity simply results from the designation of the propeller with the larger number of blades as $N_a$. The significance of $F_m$ in equation 15 will become apparent when compared with another $F_m$, derived immediately below.

The inventor will now consider the case where the blade numbers differ by 2, as when $N_f = 5$ and $N_a = 7$. Such a propeller set is shown schematically in FIG. 7. The inventor points out that, for the present analysis to apply, an additional condition must be fulfilled, namely, that the blade numbers contain no common factors. The term "no common factors" means that there is no integer which is evenly divisible into both blade numbers. For example, $N_a = 8$ and $N_f = 10$ differ by two. Yet, they have the common factor of 2. The common factor of 2 in this example in effect makes the blade sets operate as two sequential sets of blades with $N_a = 4$ and $N_f = 5$. In such an example, an analysis similar to that given for FIG. 6 would apply for each set.

In the case of a blade difference of two and no common factors, a blade crossing (blades 1A and 1F) occurs within dashed circle 11A in FIG. 6. The next crossing occurs in dashed circle 11B, halfway between blades 3A and 4F under equal propeller speeds. The crossings are not sequential as in FIG. 7. Distance 89 is $3/N_f$, and distance 91 is $2/N_a$. The midpoint distance 92 is half their sum or $$D = (3/N_f + 2/N_a) \times \tfrac{1}{2} \tag{16}$$

In the general case, the numerators (3 and 2 in this example) are actually $(N_f - 1)/2$ and $(N_a - 1)/2$ respectively. This results from the fact that any successive blade crossing occurs as close as possible to the diametric opposite of the preceding crossing. Hence, the $(N-1)/2$-th blade is involved. The equation for computing $F_c$ is the same as in the eight-blade/one-blade case, namely, $$F_c = (S_f + S_a) N_f N_a \tag{1}$$

That is, $F_c$ refers to the total number of wake cuttings per second, but now adjusted for the different number of aft blades. Further, the rotational speed of the dashed circle in traveling from point 84 to point 86 is the distance D of equation 16 divided by the time elapsed, which is the inverse of $F_c$. Algebraically, $$F_m = \left[ \frac{1}{2} \times \frac{(N_f - 1)}{N_f} + \frac{1}{2} \frac{(N_a - 1)}{N_a} \right] \times \tag{17}$$

$$\frac{1}{2} \times (S_f + S_a)(N_f N_a)$$

$$F_m = \left[ \frac{1}{2} \times \frac{N_a(N_f - 1)}{N_a N_f} + \frac{1}{2} \frac{N_f(N_a - 1)}{N_f N_a} \right] \times \tag{18}$$

$$\frac{1}{2} \times (S_f + S_a)(N_f N_a)$$

$$F_m = \frac{1}{4} [N_a N_f - N_a + N_a N_f - N_f](S_f + S_a) \tag{19}$$

$$F_m = \frac{1}{2} \left[ N_a N_f - \frac{(N_a + N_f)}{2} \right](S_f + S_a) \tag{20}$$

Again, the discussion immediately above is limited to a blade difference of 2.

Figure 8:
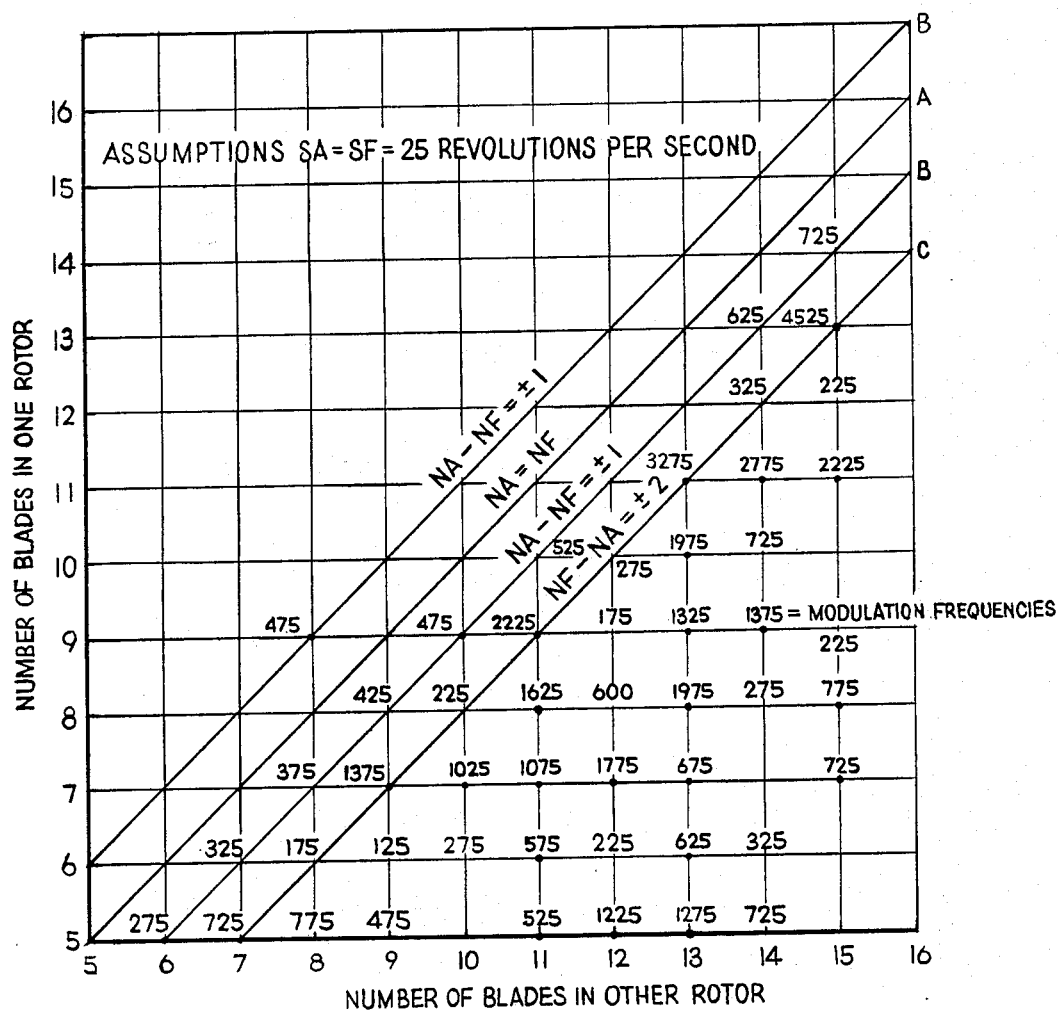
FIG. 8 is a plot of modulation frequency in counterrotating propeller pairs as a function of blade numbers.

The inventor has calculated $F_m$ for several blade configurations (using the equations above for blade differences of 1 and 2, and other approximate formula for other values of blade difference) and some results are given in FIG. 8. The inventor points out that a different equation is used for the configurations of lines B (eq. 15) than for line C (eq. 20). Also, there are no entries for line A, representing equal blade numbers. One reason for this is that, in such a case, there is no rotation of anything resembling a dashed circle 11 as in FIG. 3: all blade crossings occur simultaneously. There is no equivalent rotating noise source 23.

As shown in FIG. 8, relatively high $F_m$ is obtained for the following situations:

(1) $N_a = N_f \pm 2$, with no common factors
(2) $N_a = 7$, $N_f = 12$
(3) $N_a = 8$, $N_f = 11$ or 13.
(4) one propeller having 5 blades, the other having 7, 8, 11, 12, 13, or 14
(5) one propeller having 6 blades, the other having 11 or 13
(6) one propeller having 7 blades, the other having 9, 10, 11, 12, 13, or 15
(7) one propeller having 8 blades, the other having 11, 13, or 14
(8) one propeller having 9 blades, the other having 11, 13, or 14
(9) one propeller having 10 blades, the other having 13 or 14
(10) one propeller having 11 blades, the other having 13, 14, or 15
(11) one propeller having 13 blades, the other having 14 or 15
(12) one propeller having 14 blades, the other having 15.

These blade combinations illustrate several forms of the present invention. The large $F_m$ causes a wide spread in the sidebands of equation 8, thus causing the higher order sidebands (e.g., the $J_2$ sideband is of lower order than the $J_3$) to become inaudible.

Several important aspects of the present invention will now be discussed. One, the modulation of the carrier wave (which allows one to manipulate the noise spectrum of equation 8) arises from the back-and-forth motion of the pulsing noise source 23 in FIG. 3. Such motion results from the rotation of the pulsing noise source about the center 25. The invention increases the modulation frequency, $F_m$, above that for equal blade numbers ($F_m$=zero for equal blade numbers as shown by line A in FIG. 8) and, further, above the case of blade numbers differing by one (shown by lines B in FIG. 8). From one point of view, this increase in $F_m$ results from a synthetically induced spatial skipping of crossing locations (the dashed circles 11 are the crossing locations), as will now be explained.

In FIG. 6, one crossing occurs at point 75, and the next crossing in time occurs at point 76. These crossings are adjacent in space in the sense that the blade involved in the first crossing (i.e., blade 1A, with crossing at point 75) is adjacent to the blade on the same propeller which is involved in the next crossing (i.e., blade 2A, and crossing at point 76 in this example). There is no intervening blade between blades 1A and 2A. (An intervening blade is, for example, blade 2A which lies between blades 1A and 3A. These latter two blades are thus non-adjacent.) Therefore, the blade crossings in FIG. 6 which are sequential in time (e.g., at points 75 and 76) are adjacent in space.

Figure 7:
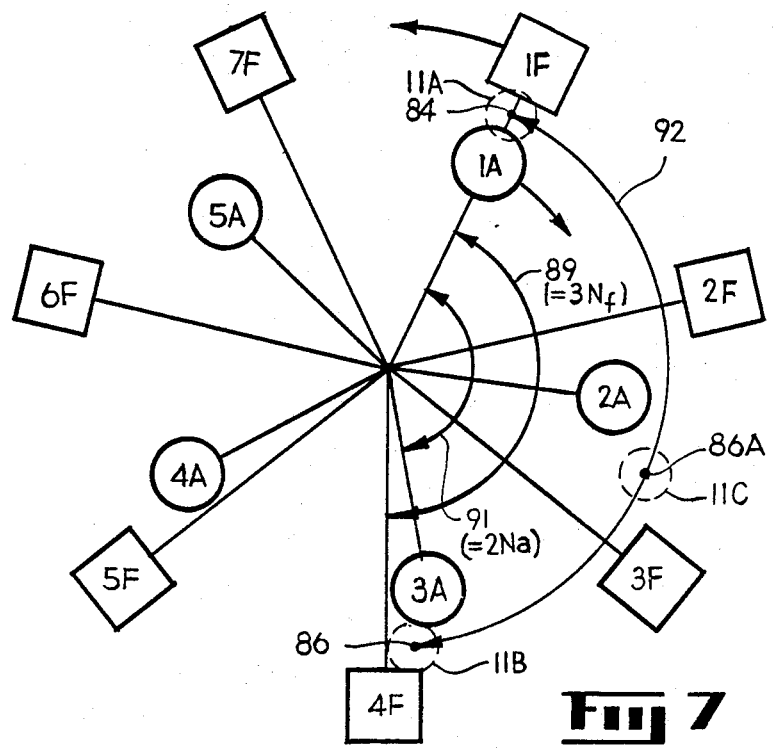

The situation is different in FIG. 7. In that Figure, one crossing occurs at point 84, while the next crossing occurs at point 86. These two crossing points are not spatially adjacent: blade 1A is involved in the first crossing, while blade 3A is involved in the subsequent crossing, and blade 2A lies between them, making them non-adjacent.

Therefore, in FIG. 7, the crossing points which are sequential in time (e.g., points 84 and 86) are non-adjacent in space. The crossing points are non-adjacent for at least the reason that another crossing point (namely, point 86A in dashed circle 11C, involving blades 2A and 3F) lies between points 84 and 86, yet its crossing occurs latter in time than both crossings at points 84 and 86.

As a consequence of this non-adjacency, the spatial distance between sequential crossings is increased in FIG. 7 as compared with FIG. 6. The distance between dashed circles 11A and B in FIG. 7 is increased, so that the distance traveled between sequential crossings is greater, thus effectively increasing the rotational frequency of the pulsing noise source 23 in FIG. 3. The preceding discussion gives one way of explaining the great difference in $F_m$ which occurs in changing from, for example, nine blades-ten blades ($F_m$=425 in FIG. 8) to 9 blades-eleven blades ($F_m$=2225). This jump in $F_m$ gives a propeller designer greater flexibility in manipulating the noise spectrum of equation 8 by, as previously discussed, moving most of the noise energy outside the audible range.

The non-adjacency of sequential crossing points can be viewed in a different way. As pointed out above, the distance D between crossing points 75 and 76 in FIG. 6 is the quantity $\frac{1}{2}(1/N_a+1/N_f)$. That is, D is the average of the blade spacings. As a mathematical fact, D must be equal to, or less than, the larger of $1/N_a$ or $1/N_f$. The reader will recall that $1/N$ is the spacing between blades. Thus, in FIG. 6, the distance between sequential crossing points (e.g., points 75 and 76) is equal to or less than the larger blade spacing (e.g., the spacing between blades 1A and 2A in this example.)

In contrast, the distance between sequential crossings (e.g., points 84 and 86) in FIG. 7 is greater than the blade spacing on either propeller. $1/N_a$ and $1/N_f$ are the blade spacings, but the distance between sequential crossings is D as computed in equation 16, above. Clearly, D in this case must be greater than either blade spacing. Therefore, a different view of the invention is that the distance between sequential crossings is greater than the blade spacing on either propeller. This difference causes the modulating phenomenon (i.e., the dashed circles 11, representing the rotating, pulsing noise source 23 in FIG. 3) to travel farther between pulses in FIG. 7 as compared with FIG. 6.

A second important aspect of the invention is explained with reference to FIG. 9. The term "radius ratio" will first be defined. Radius ratio refers to the ratio of the blade root (radius $R_r$) to the radius of the blade tip (radius $R_t$). Of course, radius ratio will always be less than unity. The discussion above assumed that the noise pulse occurred in a discrete region, as in dashed circles 11 in FIGS. 2 and 9. Dashed circles 11 are located near the circumference of the propeller. However, the actual crossing noise is produced all along the propellers, all along region 102 in FIG. 9. However, with high radius ratio, the simplified situation of FIG. 2 is approached: there is no blade crossing in region 104 in FIG. 9, and thus no noise of interest to the present discussion is produced there. The noise production approaches being localized in dashed circle 11 as radius ratio increases. Applicant has analyzed counter-rotating propeller sets having a radius ratio of 0.4 and believes that their blade crossing pulses resemble the rotating noise source 23 in FIG. 3.

As to a third aspect of the invention, the preceding discussion has not considered whether the larger number of blades should occur on the fore propeller or the aft propeller. A smaller blade, in general, produces a smaller wake. When an aft blade cuts the smaller wake, less noise results. Thus, if the fore propeller and the aft propeller are equally loaded (i.e., producing equal thrust), then the loading per blade will be less on the propeller having more blades. Therefore, a larger number of smaller blades on the fore propeller is desirable because many small wake cuttings (i.e., noise pulses) are preferable to few large ones.

In addition, the incoming airstream to the aft propeller is traveling faster than that incoming to the fore propeller because the fore propeller accelerates the airstream fed to the aft propeller. The increased airspeed worsens the choking characteristics of the aft propeller. However, a reduced number of blades on the aft propeller improves such characteristics. Therefore, a smaller number of blades on the aft propeller is desirable for choking reasons. The choking problem becomes especially important in high speed and supersonic operation. Consequently, noise and choking indicate that the larger number of blades should be on the fore propeller.

As to a fourth aspect of the invention, the preceding discussion has only considered noise in the radial plane of FIG. 3, wherein the observer 33 stands. Such noise is frequency modulated by unequal blade numbers, as discussed above. Another noise will now be considered, namely, that perceived by an observer (not shown) positioned on the axis 1 in FIGS. 1A and 9. This on-axis noise is not frequency modulated because the distance between the observer and the crossing locations does not change. However, the present invention gives an increase in frequency of such on-axis noise, as will now be shown.

In both an eight-blade/eight-blade case and an eleven-blade/five-blade case, the crossing frequency is computed from equation 1. However, the actual perceived frequency will be different in the two cases. In the 8/8 blade case, the perceived frequency is one-eighth of the computed crossing frequency because the crossings occur in simultaneous groups of eight. In the 11/5 case, the perceived frequency is equal to the crossing frequency because the crossings are sequential in time: none are simultaneous. Therefore, the on-axis noise produced by the present invention is of significantly higher frequency than the on-axis noise produced by unequal-bladed counterrotating pairs. This higher frequency can be advantageous because, one, higher frequencies attenuate faster with distance, two, higher frequencies are sometimes more tolerable to listeners than low frequencies and, three, certain high frequencies are sometimes allowable under government regulations while some lower frequencies may not be. Therefore, the present invention can provide a higher frequency on-axis noise together with a frequency or phase modulated noise in the plane of the propeller, with a composite noise which is a sum of the two in the regions between the axis and the radial plane.

The term "distance" has been used in the discussion above, as, for example, distances 77 and 79. One measure of distance is angular distance: angle 77 is defined in geometry as the ratio of the length of arc 77 to the circumference of the circle of which arc 77 forms a part. Thus, there is no significant difference in the present context between angular distance and actual arc length.

Of course, if arc length is to be used, the arcs must be taken from circles of comparable diameter: arc 77 could be longer than arc 79, even though the latter arc represents a larger angle because of the different radii at which these arcs are shown.

An invention has been described in which a counterrotating aircraft propeller set is arranged so that fore-aft blade crossings produce a phase- or frequency modulated carrier wave. This carrier wave has an acoustic frequency spectrum which can be manipulated by altering variables such as blade numbers and blade speeds in order to produce a desirable noise spectrum. One desirable spectrum is that having much of the acoustic energy present at frequencies which are inaudible to humans. In a simplified sense, the invention divides up a given amount of noise energy into many components of different frequencies, so that the energy in a selected frequency range (e.g., in the audible range) is reduced.

Although this discussion is framed in terms of equal fore and aft rotational speeds, this is not essential. Unequal speeds can be used without reducing significantly the effectiveness of the invention. A rotating frame of reference (in which the relative rotational speeds are equalized) can be used. In that case, the reference speed simply adds or subtracts a minor amount from the value of FM (which is very large compared to the physical hardware rotational speeds).

TABLE 1

BESSEL FACTORS UP TO THE FIFTEENTH SIDE CURRENT PAIR AND FOR A MODULATION INDEX $\beta$ UP TO 12

| $\beta$ | $J_0(\beta)$ | $J_1(\beta)$ | $J_2(\beta)$ | $J_3(\beta)$ | $J_4(\beta)$ | $J_5(\beta)$ | $J_6(\beta)$ | $J_7(\beta)$ |
|---|---|---|---|---|---|---|---|---|
| 1 | 0.7652 | 0.4401 | 0.1149 | 0.0196 | 0.0025 | 0.00025 | $0.0^4 21$ | $0.0^5 15$ |
| 2 | 0.2239 | 0.5767 | 0.3528 | 0.1289 | 0.034 | 0.00704 | 0.0012 | $0.0^3 175$ |
| 3 | −0.2601 | 0.3391 | 0.4861 | 0.3091 | 0.1320 | 0.04303 | 0.0114 | $0.0^2 255$ |
| 4 | −0.3971 | −0.066 | 0.3641 | 0.4302 | 0.2811 | 0.1321 | 0.0491 | 0.0152 |
| 5 | −0.1776 | −0.3276 | 0.0466 | 0.3648 | 0.3912 | 0.2611 | 0.131 | 0.0534 |
| 6 | 0.1506 | −0.2767 | −0.2429 | 0.1148 | 0.3576 | 0.3621 | 0.2458 | 0.1296 |
| 7 | 0.3001 | −0.0047 | −0.3014 | −0.1676 | 0.1578 | 0.3479 | 0.3392 | 0.2336 |
| 8 | 0.1717 | 0.2346 | −0.133 | −0.2911 | −0.1054 | 0.1858 | 0.3376 | 0.3206 |
| 9 | −0.0903 | 0.2453 | 0.1448 | −0.1809 | −0.2655 | −0.05504 | 0.2043 | 0.3275 |
| 10 | −0.2459 | 0.0435 | 0.2546 | 0.0584 | −0.2196 | −0.2341 | −0.0145 | 0.2167 |
| 11 | −0.1712 | −0.1768 | 0.139 | 0.2273 | −0.015 | −0.2383 | −0.2016 | 0.0184 |
| 12 | 0.0477 | −0.2234 | −0.085 | 0.1951 | 0.1825 | −0.0735 | 0.244 | −0.1703 |

| $\beta$ | $J_8(\beta)$ | $J_9(\beta)$ | $J_{10}(\beta)$ | $J_{11}(\beta)$ | $J_{12}(\beta)$ | $J_{13}(\beta)$ | $J_{14}(\beta)$ | $J_{15}(\beta)$ |
|---|---|---|---|---|---|---|---|---|
| 1 | $0.0^7 94$ | $0.0^8 525$ | $0.0^9 2631$ | $0.0^{12}$ | $0.0^{12} 5$ | | | |
| 2 | $0.0^4 222$ | $0.0^5 25$ | $0.0^6 25$ | $0.0^7 23$ | $0.0^8 19$ | | | |
| 3 | $0.0^3 493$ | $0.0^4 844$ | $0.0^4 1293$ | $0.0^5 179$ | $0.0^6 228$ | | | |
| 4 | $0.0^2 403$ | $0.0^3 94$ | $0.0^3 195$ | $0.0^4 37$ | $0.0^5 624$ | | | |
| 5 | 0.01841 | $0.0^2 552$ | $0.0^2 1468$ | $0.0^3 351$ | $0.0^4 763$ | | | |
| 6 | 0.05653 | 0.0212 | $0.0^2 696$ | $0.0^2 205$ | $0.0^3 545$ | | | |
| 7 | 0.128 | 0.0589 | 0.02354 | $0.0^2 833$ | $0.0^2 266$ | | | |
| 8 | 0.2235 | 0.1263 | 0.0608 | 0.0256 | 0.0096 | 0.0033 | | |
| 9 | 0.3051 | 0.2149 | 0.1247 | 0.0622 | 0.0274 | 0.0108 | 0.0039 | |
| 10 | 0.3179 | 0.2919 | 0.2075 | 0.1231 | 0.0634 | 0.0297 | 0.012 | 0.00451 |
| 11 | 0.225 | 0.3089 | 0.2804 | 0.201 | 0.1216 | 0.0643 | 0.0304 | 0.013 |
| 12 | 0.0451 | 0.2304 | 0.3005 | 0.2704 | 0.1953 | 0.1201 | 0.065 | 0.032 |

These factors multiplied by $I_m$ yield the various spectrum amplitudes.

Numerous modifications and substitutes can be undertaken without departing from the true spirit and scope of the present invention. What is desired to be secured by Letters Patent is the invention as defined by the following claims.

We claim:

1. A counterrotating aircraft propeller set comprising:
   (a) a first propeller having N1 blades and
   (b) a second propeller having N2 blades wherein N1 and N2 are selected from the following group of numbers: 3, 5, 7, 9, 11, 13, 15, and 17 and wherein the difference between N1 and N2 is 2.

2. A counterrotating aircraft propeller set comprising:
  (a) a first propeller having 8 blades and
  (b) a second propeller having 11 blades.

3. A counterrotating aircraft propeller set in which the blade crossings which are sequential in time are non-adjacent in space.

4. A counterrotating aircraft propeller pair in which the distance between sequential blade crossings is greater than the blade spacing on either propeller.

5. A counterrotating aircraft propeller set comprising:
  a first propeller having a first number of blades; and
  a second propeller having a second number of blades,
in which the blade crossings which are sequential in time are non-adjacent in space.

6. A counterrotating aircraft propeller set comprising:
  a first propeller having a first number of blades; and
  a second propeller having a second number of blades,
in which the distance between the locations of sequential blade crossings is greater than the blade spacing on either propeller.

7. A method of reducing the audible noise produced by a counterrotating aircraft propeller set having aft and fore propellers, comprising the step of:
  causing the locations of the blade crossings to rotate about an axis at a speed greater than the quantity:

$$\frac{1/2\,(1/N_a + 1/N_f)}{(1/N_a - 1/N_f)/(S_f + S_a)}$$

in which $N_a$ and $N_f$ are the numbers of blades on the aft and fore propellers, respectively, and $S_a$ and $S_f$ are the rotational speeds of the aft and fore propellers, respectively.

8. A method of reducing audible noise produced by a counterrotating aircraft propeller set which produces a modulating phenomenon when a fore propeller blade crosses an aft propeller blade, such modulating phenomenon rotating about an axis, comprising the step of:
  causing the modulating phenomenon to rotate about the axis at a speed equal to or greater than the quantity:

$$\frac{1/2\,(1/N_a + 1/N_f)}{(1/N_a - 1/N_f)/(S_f + S_a)}$$

in which $N_a$ and $N_f$ are the numbers of blades on the aft and fore propellers, respectively, and $S_a$ and $S_f$ are the rotational speeds of the aft and fore propellers, respectively.

9. A counterrotating aircraft propeller set comprising:
  a first propeller having a first number of blades; and
  a second propeller having a second number of blades,
in which the aircraft propeller set generates a far-field noise having a resultant component described by the following equation:

$$P = \sin(W_c + M \sin(W_m t)),$$

in which P represents pressure, $W_c$ represents a carrier frequency, M represents a modulation index, $W_m$ represents a modulation frequency, and t represents time.

10. A counterrotating aircraft propeller set comprising:
  a first propeller having N1 blades; and
  a second propeller having N2 blades,
in which N1 and N2 differ by 2 and have no common factors.

11. A counterrotating aircraft propeller set comprising:
  a first propeller having 7 blades; and
  a second propeller having 12 blades.

12. A counterrotating aircraft propeller set comprising:
  a first propeller having 8 blades; and
  a second propeller having 11 or 13 blades.

13. A counterrotating aircraft propeller set comprising:
  a first propeller having 5 blades; and
  a second propeller having 7, 8, 11, 12, 13, or 14 blades.

14. A counterrotating aircraft propeller set comprising:
  a first propeller having 6 blades; and
  a second propeller having 11 or 13 blades.

15. A counterrotating aircraft propeller set comprising:
  a first propeller having 7 blades; and
  a second propeller having 9, 10, 11, 12, 13, or 15 blades.

16. A counterrotating aircraft propeller set comprising:
  a first propeller having 8 blades; and
  a second propeller having 10 blades.

17. A counterrotating aircraft propeller set comprising:
  a first propeller having 8 blades; and
  a second propeller having 11, 13, or 14 blades.

18. A counterrotating aircraft propeller set comprising:
  a first propeller having 8 blades; and
  a second propeller having 12 blades.

19. A counterrotating aircraft propeller set comprising:
  a first propeller having 9 blades; and
  a second propeller having 11, 13, or 14 blades.

20. A counterrotating aircraft propeller set comprising:
  a first propeller having 10 blades; and
  a second propeller having 13 or 14 blades.

21. A counterrotating aircraft propeller set comprising:
  a first propeller having 11 blades; and
  a second propeller having 13, 14, or 15 blades.

22. A counterrotating aircraft propeller set comprising:
  a first propeller having 13 blades; and
  a second propeller having 14 or 15 blades.

23. A counterrotating aircraft propeller set comprising:
  a first propeller having 14 blades; and
  a second propeller having 15 blades.

* * * * *